United States Patent [19]

Sadeh et al.

[11] Patent Number: 5,035,503

[45] Date of Patent: Jul. 30, 1991

[54] ELECTRO OPTICALLY CORRECTED COORDINATE MEASURING MACHINE

[76] Inventors: Yaacov Sadeh, 11/6 Bialik, Nes Ziona; Yaacov Makover, 87 Moshav Bet Alazari, Rechovot, both of Israel

[21] Appl. No.: 625,020

[22] Filed: Dec. 10, 1990

Related U.S. Application Data

[63] Continuation of Ser. No. 401,039, Aug. 31, 1989, which is a continuation of Ser. No. 147,134, Jan. 22, 1988.

[30] Foreign Application Priority Data

Jan. 23, 1987 [IL] Israel ........................................ 81364

[51] Int. Cl.⁵ .......................... G01B 11/26; G01C 1/00
[52] U.S. Cl. ..................................... 356/152; 33/1 M; 33/503; 356/150; 356/375; 356/400
[58] Field of Search ............... 356/150, 152, 375, 400; 33/1 M, 503

[56] References Cited

U.S. PATENT DOCUMENTS

| | | | |
|---|---|---|---|
| 3,558,231 | 1/1971 | Bakel | 356/152 |
| 3,881,107 | 4/1975 | Bory | 356/152 |
| 4,276,698 | 7/1981 | Dore et al. | 33/1 M |
| 4,663,852 | 5/1987 | Guarini | 33/503 |
| 4,714,344 | 12/1987 | Hamar | 356/152 |
| 4,738,531 | 4/1988 | Lloyd et al. | 356/150 |
| 4,808,064 | 2/1989 | Bartholet | 356/152 |
| 4,847,511 | 7/1989 | Takada et al. | 356/152 |
| 4,849,620 | 7/1989 | Guerin et al. | 356/152 |
| 4,874,937 | 10/1989 | Okamoto | 356/152 |

Primary Examiner—Stephen C. Buczinski
Attorney, Agent, or Firm—Price, Heneveld, Cooper, DeWitt & Litton

[57] ABSTRACT

A device for electro-optical monitoring of angular and lateral deflections of a moving carriage relative to a stationary track along which it moves, including a transmitting unit mounted on the moving carriage and including a light source illuminating a pattern, a receiving unit mounted on the track in light receiving relationship with the transmitting unit and including optical sensor apparatus for sensing the light transmitted from the transmitting unit and providing an output signal corresponding thereto, and a micro computer arranged to receive the output signal from the receiving unit and to determine the angular and lateral deflection of the carriage utilizing the information derived from the signal.

22 Claims, 3 Drawing Sheets ial parts on the production line without
ELECTRO OPTICALLY CORRECTED COORDINATE MEASURING MACHINE This is a continuation of co-pending application Ser. No. 401,039, filed on Aug. 31, 1989, now abandoned, which is a continuation of application Ser. No. 147,134, filed Jan. 22, 1988.

FIELD OF THE INVENTION

The present invention relates to an electro optical device for monitoring the angular and lateral deflections of a moving carriage along a stationary track in general and, in particular, to a three dimensional coordinate measuring system including such monitoring devices.

BACKGROUND OF THE INVENTION

Measuring dimensions of a shaped three dimensional body is done today using coordinate measuring machines (C.M.M.). These systems are built using accurately manufactured and assembled mechanical parts.

This dependence on mechanical precision in order to acquire and maintain the measuring accuracy has severe drawbacks.
1. The cost of the C.M.M. is high due to the high cost of its accurate mechanical parts and the complexity of construction.
2. Accuracy of the coordinate measuring machine can be maintained only under controlled environmental conditions, usually in a clean, air-conditioned room.
3. Keeping the accuracy of the system in time calls for periodical calibration actions which are complicated and expensive.

These drawbacks restrict the use of the traditional coordinate measuring machines only to post process quality control applications, because C.M.M. machines are used only in environmentally controlled rooms, physically separated from the production line.

The underlying concept of the present invention is to continuously measure the inaccuracies of the measuring system in all dimensions. In doing so, the accuracy of the measuring system no longer depends on the inherent accuracy of the mechanical construction, hence the C.M.M. can be produced using less accurate and therefore less expensive components. The C.M.M. has further built in accuracy monitoring and calibration. The system can be put in the manufacturing plant next to the production line without any reduction in its operational accuracy.

The method used to monitor the inaccuracies of the C.M.M. is electro-optical. And the principle of operation is based on measuring and calculating all angular and lateral misalignments of each moving axis of the C.M.M. in all of its six degrees of freedom. By using electro-optical measuring methods combined with computer based analysis of the measurement results, an accurate position analysis of the measuring probe, used by the C.M.M. is generated and results in a long lasting, in process, accurate measurement of manufactured parts.

SUMMARY OF THE INVENTION

An objective of the present invention is to provide a coordinate measuring system which overcomes all the above noted limitations of the prior art. Hence the system proposed according to this invention can measure three dimensional parts on the production line without reduction in its measuring accuracy due to the harsh environmental conditions which are typical of production lines. Further, the measuring system is constructed of low cost mechanical components.

According to one aspect of the present invention there is provided a device for monitoring both angular and lateral deflections composed of two separate units. One unit, mountable on the moving carriage, has an accurately defined, saw tooth shaped, illuminated pattern. This pattern is located in the focal plane of a lens. Parallel light rays from the illuminated pattern are transferred from the lens to a similar lens located along the same optical axis in the stationary receiving unit. A position sensitive device such as a C.C.D. line scan camera is located in the focal plane of the receiving lens, hence the transmitted pattern is regenerated on the camera's detecting surface. Any angular displacements of the transmitting unit relative to the receiving unit in either yaw roll or pitch angles cause the reconstructed pattern on the camera to either shift horizontally, vertically or rotate in the camera's plane in accordance with the yaw, pitch and roll deflections respectively.

By measuring and analyzing the location and orientation of the pattern on the C.C.D. camera, the three angular values are calculated.

The moving transmitting unit further contains a second similar saw tooth pattern illuminated by a second monochromatic light source (preferably a laser diode). A zoom lens which is mounted on the receiving stationary unit has an optical axis directed at the center of the saw tooth pattern. The zoom operation is controlled by a D.C. motor and a position encoder. The purpose of the zooming is to provide a sharp image of the pattern on the C.C.D. camera for any location of the moving unit along the translation range of the axis. In order to take advantage of the same C.C.D. camera and circuitry, a beam deflecting prism is used to shift the optical axis of the zoom lens to the same C.C.D. camera.

When the transmitting unit moves along the translation axis, any lateral displacement of this unit causes a corresponding measurable parallel displacement of the image of the sawtooth pattern on the C.C.D. camera. By measuring and analyzing the location of the pattern on the C.C.D. camera, the two lateral displacement values are calculated.

There is also provided in accordance with the present invention a three dimensional coordinate measuring system with electro-optical mapping of the various angular and lateral errors of its moving axes.

The C.M.M. is constructed of three translation stages mounted one on top of the others. Each stage moves in a direction perpendicular to the movements of the other stages in a way which enables movement of a measuring probe in three dimensions. The movement of each stage is generated by a D.C. motor and a driver, which rotates a ball screw that moves the stage. The position of each stage along its axis is controlled by a servo loop containing a position encoder and a servo circuit which drives the D.C. motor mounted on the stage.

Each stage further contains an electro optical device such as described above which monitors all angular and lateral deflections of the moving stage. When the C.M.M. moves the measuring probe from one point to another, the patterns on each transmitting unit are sequentially illuminated while synchronized scans of the patterns' images on the cameras are being generated. The video signals from each camera at each scan are transferred via an analog multiplexer into the C.M.M. computer for analysis. As a result, the computer contains, for each location, the complete set of six figures for translation and rotation of the stage's position in space. Hence, the accurate location of the measuring probe which is mounted on the translation stages is calculated.

BRIEF DESCRIPTION OF THE DRAWINGS

The invention is herein described by way of example only with reference to the accompanying drawings, wherein.

DESCRIPTION OF THE PREFERRED EMBODIMENT

Figure 1:
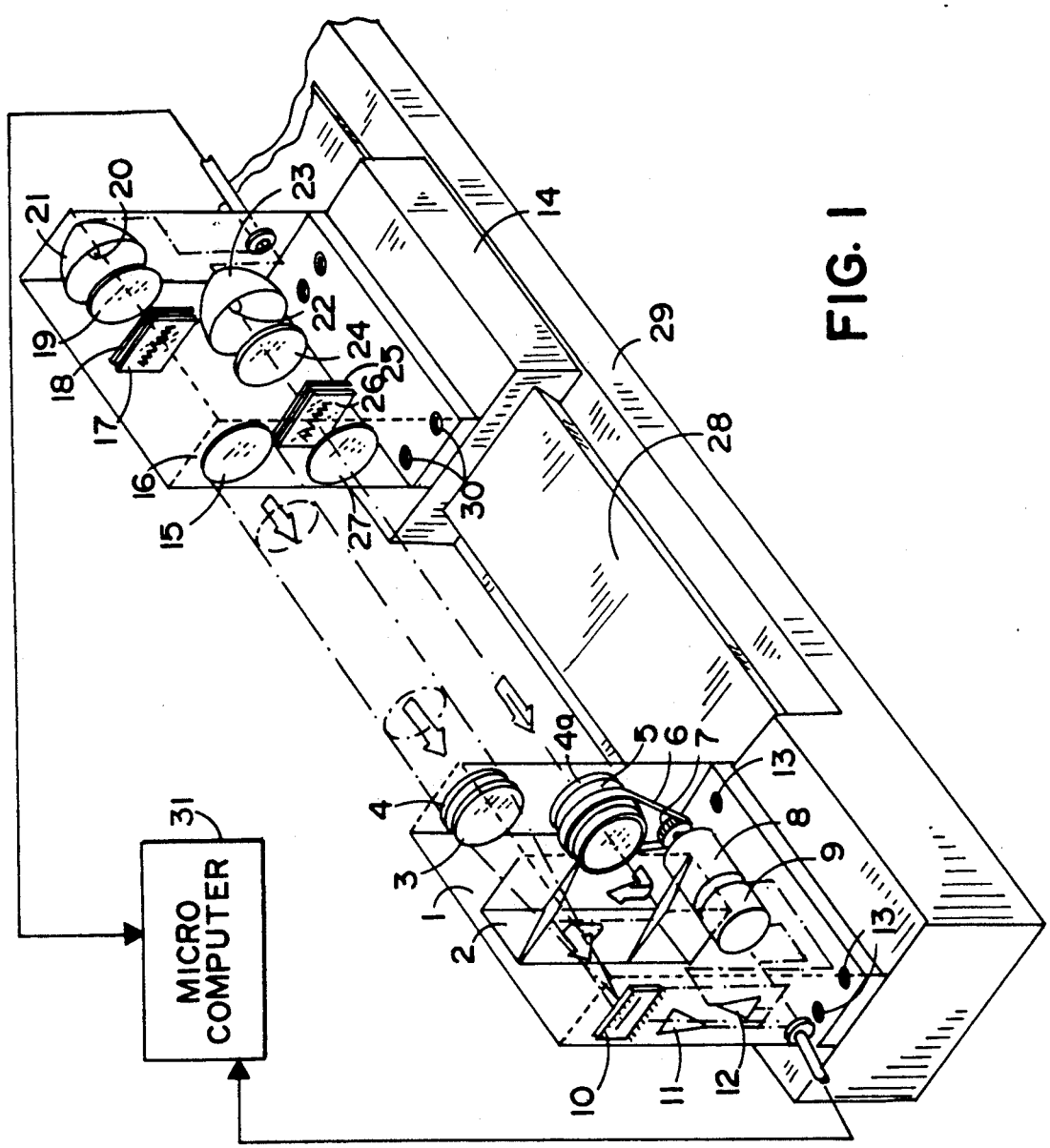
FIG. 1 demonstrates the device for monitoring both angular and lateral deflection of a moving stage according to the present invention.

The device for electro-optical mapping of angular and lateral deflections in FIG. 1 is composed of a receiving unit 1 mounted on a base 29 as by mounting screw holes 13 and a transmitting unit 14 which slides along a slideway 28 mounted on base 29. The transmitting unit is composed of two sections. One section includes a monochromatic light source 20 with a reflector 21 directing the light from the source 20 on a condensing lens 19 and further on a diffusing filter 18. The light scattered forward from the diffuser 18 backlights a transparent pattern which is etched on a glass plate 17. The pattern utilized will depend upon the particular optical scanner in the device. When using a line scanner, the pattern must have a repeating element along the axis of the scanner as well as variation in the direction perpendicular to that axis. One suitable pattern has a saw tooth shape, preferably defining angles of 45 degrees relative to the horizon. When utilizing an area sensor, such as a CCD television camera, any two dimensional pattern of which it is possible to determine the exact location of its features on a two-dimensional sensor can be utilized. While the use of an area sensor provides greater ease of analysis, use of a line scanner is generally faster and less expensive. This section further includes a second lens 16 mounted at a distance equal to its focal length from glass plate 17 and a narrow band filter 15 which passes only the monochromatic light emitted from source 20.

The second section of the transmitting unit 2 contains a second monochromatic light source 22 with a reflector 23 and a condensing lens 24. A diffusing filter 25 scatters and light homogeneously on a glass plate 26, having a transparent pattern etched thereon. Preferably this pattern is similar to the pattern on glass plate 17. The light is emitted through a narrow band filter 27. The transmitting unit is mounted on the sliding base 14 as by mounting screw holes 30.

The receiving unit 1 is similarly divided into two sections. The first section includes a narrow band filter 4 similar to filter 15 and a lens 3 which focuses the received light through a beam splitting prism 2 onto an optical position sensor, which may comprise a line scanning C.C.D. device 10 or an area scanner, and which is mounted in the focal plane of lens 3.

The second section further includes a movable lens assembly 5. Movable lens assembly 5 may comprise any lens which is arranged to be movable along its optical axis so as to always provide a sharp image. Preferably, movable lens assembly 5 comprises a zoom lens assembly, as illustrated, which is controlled by an electric motor 8, driven by motor driver 12 which rotates pinion 7, driving a belt 6 which rotates the zoom changing mechanism. A position encoder 9, mounted coaxially with motor 8, determines the zooming condition of lens 5. Lens 5 images the pattern on glass plate 26 on position sensor 10, via the beam splitter 2 which folds the optical axis of lens 5 onto the optical axis connecting lens 3 and position sensor 10.

The video signal generated by position sensor 10 is transferred via a video amplifier 11 to an external micro computer 31 for further analysis.

In operation, the single optical position scanner 10 receives signals from both the first and second light source assemblies. This is arranged preferably on a time sharing basis wherein first the first light source is illuminated and the first target is scanned and then the first light source is extinguished and the second light source is illuminated and the second target is scanned.

It should be appreciated that the principle of operation herein implemented by one preferred embodiment can be realized in a plurality of ways using different lenses, position sensitive cameras and optical configurations.

It will further be appreciated that the system can alternately be utilized with only a single transmitting and receiving element, rather than two. In this case, only angular deflections will be measured, the lateral deflections being calculable from the measured angular deflections. Such a system is useful in situations in which high accuracy is not required.

Figure 2:
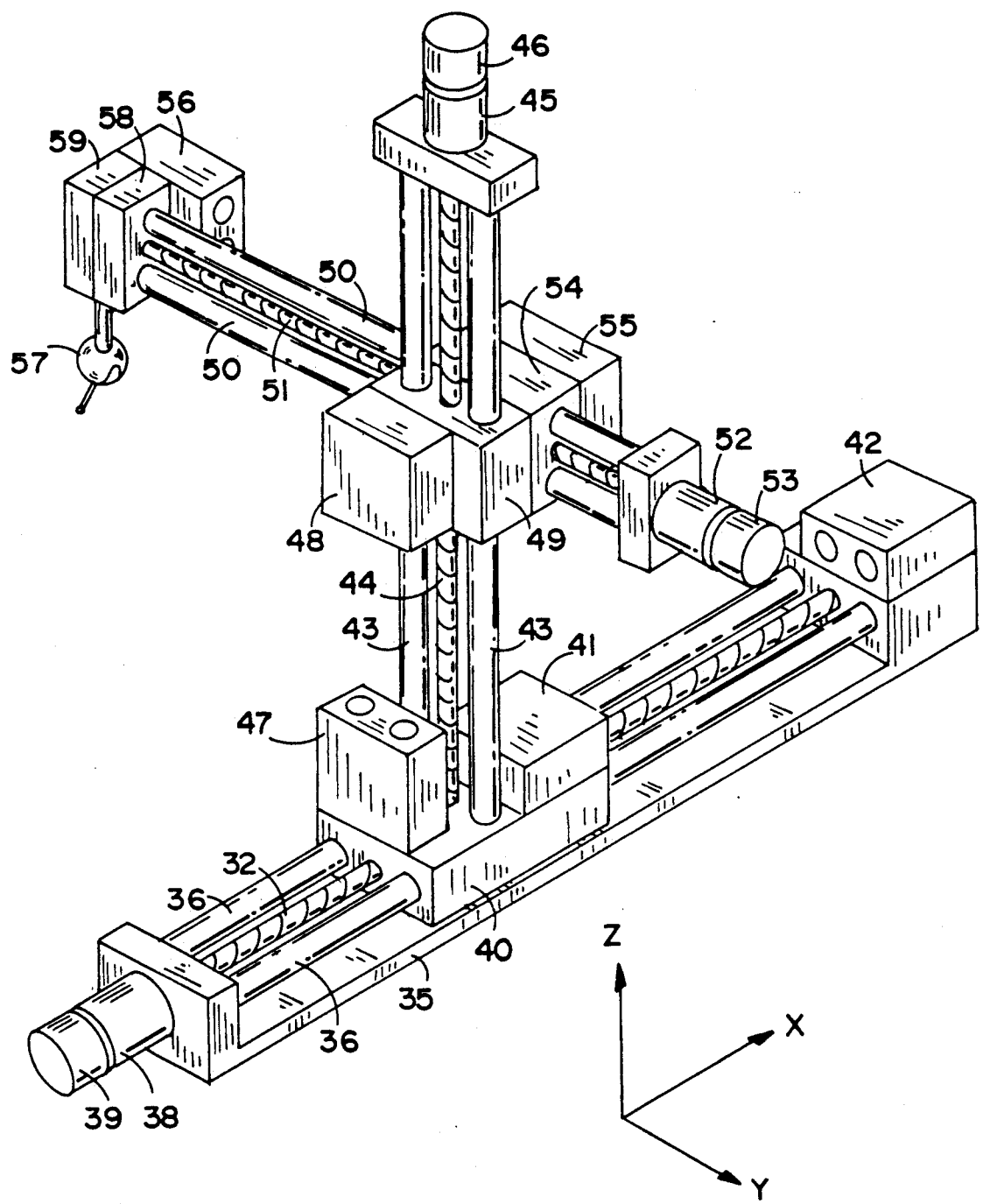
FIG. 2 describes one form of a three dimensional cartesian manipulator which is equipped with the device of FIG. 1 on all three axes.

Reference is made to FIG. 2 where one preferred embodiment of a three dimensional cartesian manipulator is described using said electro optical deviations monitoring device. A carriage 40 moves along the x direction on slides 36 by means of lead screw 37 driven by motor 38, having a position encoder 39 mounted coaxially therewith. Screw 37 and slides 36 are mounted on a base 35. A transmitting unit 41 is mounted on carriage 40 facing a receiving unit 42 which is mounted on base 35.

A similar assembly is mounted on carriage 40 generating the z movement. Carriage 49 moves along slides 43 by means of lead screw 44 driven by motor 45, its position controlled by encoder 46. A transmitting device 47 is mounted on carriage 40 with a complementary receiving unit 48 being mounted on carriage 49.

The y movement is generated by carriage 54, mounted on carriage 49, and sliding along slides 50 by means of motor 52 and position encoder 53. Movement in the y axis is generated by moving slides 50 and lead screw 51 along carriage 54. A transmitting unit 56 is mounted on base 58, facing the receiving unit 55 which is mounted on slides 54. An instrument, such as a measuring probe 59, whose location in space is to be determined, is mounted on slide 58. In this embodiment, measuring probe 59 comprises a measuring ball and probe 57.

It will be appreciated by those skilled in the art that, in the event that the object to be measured is one or two-dimensional, or measurement in only one or two dimensions is required, a single device as illustrated in FIG. 1, or a cartesian manipulator of two dimensions including two such devices, may be employed.

Figure 3:
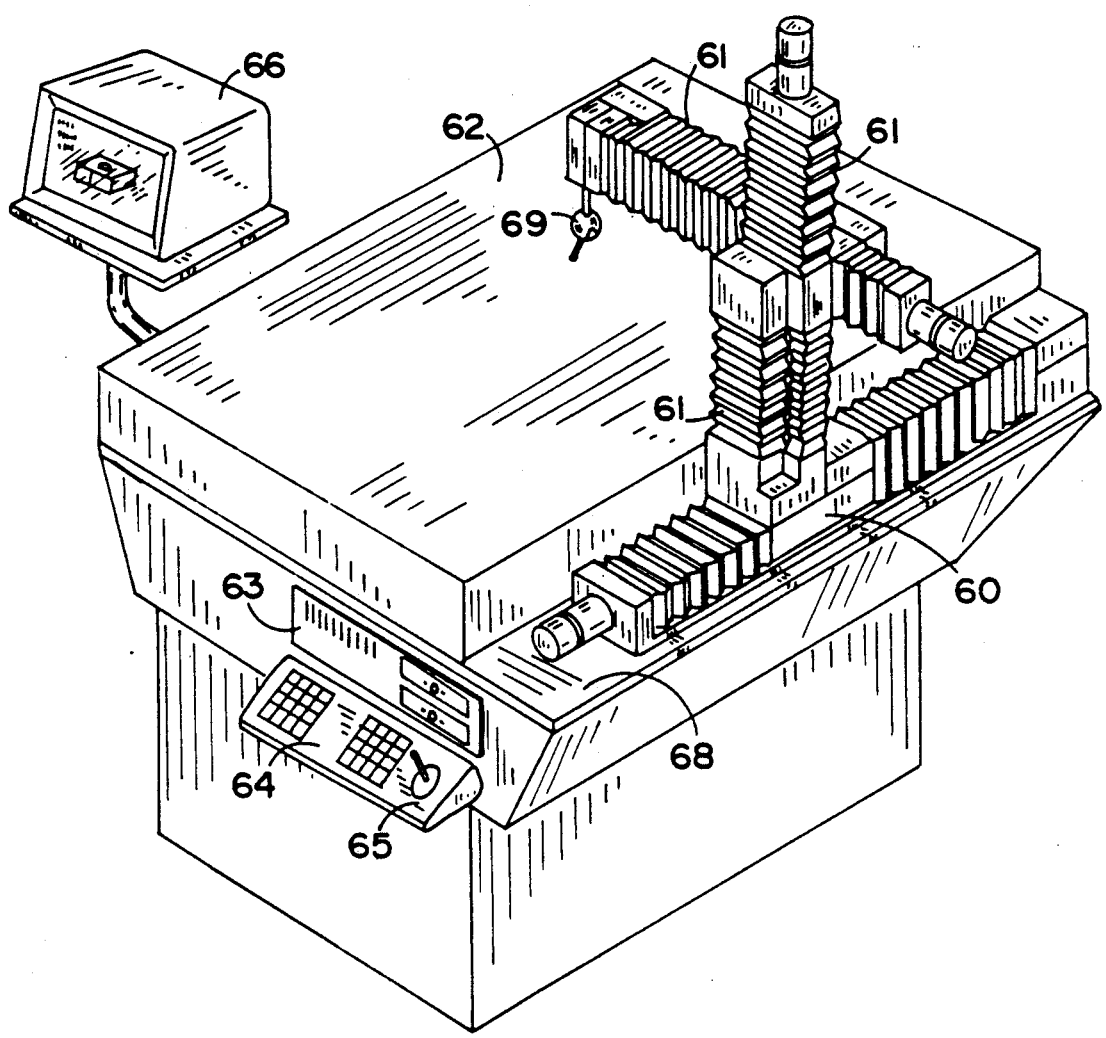
FIG. 3 illustrates a complete C.M.M. based on the principle proposed in the present invention.

FIG. 3 illustrates a coordinate measuring machine using the invention described herein. The manipulator 60, such as that illustrated in FIG. 2, is covered with flexible folding dirt protectors 61 and placed on a base 68. A granite plate 62 is mounted as well on base 68, serving as base plate for the measured bodies. A micro computer 63 controls the operation of the manipulator 60 as well as analyzing all the information received from the manipulator's stages, the deflection monitoring devices and measuring probe 69. A dedicated keyboard 64 and a joystick 65 assist the operator in teaching the system with the measuring process. A CRT display 66 displays all alphanumeric and graphic data generated by the coordinate measuring machine.

Operation of this device is as follows:

An object to be measured is placed on granite plate 62. Alternatively, the cartesian manipulator may be mounted adjacent a measuring table in a production line or other location. Micro computer 63 directs the servo motors of the three carriages 40, 49 and 54 to move the measuring probe 69 along the object to be measured.

Simultaneously with movement of the carriages, each electro optical deviation monitoring device monitors the lateral and angular deflections of the carriages, as described above. Signals corresponding to these deflections are transmitted to micro computer 63 which adjusts the position information of the relevant carriage in accordance therewith.

It will be appreciated by those skilled in the art that the invention is not limited to what has been shown and described hereinabove by way of example. Rather, the scope of the invention is limited solely by the claims which follow.

We claim:

1. A device for electro-optical monitoring of angular deflections of a moving carriage relative to a stationary track along which it moves, comprising:
   a transmitting unit mounted on the moving carriage and comprising a light source for illuminating a two-dimensional pattern, said pattern having a configuration such that rotation of the pattern around its center can be detected;
   a receiving unit mounted on the track in light receiving relationship with the transmitting unit and comprising an optical sensor means for sensing the shift and roll of the illuminated pattern transmitted from said transmitting unit and providing an output signal corresponding thereto; and
   micro computer means arranged to receive the output signal from said receiving unit and utilize the information derived from said signal to determine the angular deflection of said carriage.

2. A device according to claim 1 wherein said transmitting unit further comprises:
   a mono-chromatic light source including a light directing reflector and lens assembly;
   a lens having a narrow band filter as front exit window;
   said two-dimensional pattern being of saw-tooth configuration and disposed in the focal plane of said lens and arranged to be illuminated by said light source; and
   said receiving unit further comprises:
   a narrow band filter as input window;
   a lens adjacent said filter;
   an optical position sensor means disposed in the focal plane of said lens;
   said micro computer being arranged to control said light source and to evaluate the position deflection of said pattern on the position sensor means for determination of angular deflections.

3. A device according to claim 2 wherein said optical position sensor means comprises a line scanner.

4. A device according to claim 2 wherein said optical position sensor means comprises an area scanner.

5. A device according to claim 1 further comprising means for monitoring both lateral and vertical deviations of said carriage comprising:
   a second two-dimensional pattern mounted in said transmitting unit;
   a second light source illuminating said second two-dimensional pattern;
   a movable lens assembly arranged to receive the light transmitted from said second light source through said second two-dimensional pattern and transmit it to said optical sensor means;
   means for merging the optical axis of said movable lens onto the optical axis of the optical sensor means;
   said optical sensor means arranged to provide a second output signal corresponding to the light transmitted by said movable lens assembly; and
   said micro computer means being arranged to receive the second output signal from said receiving unit and to determine from said signal the lateral deflection of said carriage.

6. A device according to claim 2 further comprising means for monitoring both lateral and vertical deviations of said carriage comprising:
   a second light source illuminating a pattern of saw-tooth configuration mounted in said transmitting unit;
   a movable lens assembly arranged to receive the light transmitted from said second light source and transmit it to said position sensor means;
   means for merging the optical axis of said movable lens onto the optical axis of the optical sensor means;
   said optical sensor means arranged to provide a second output signal corresponding to the light transmitted by said movable lens assembly; and
   said micro computer means being arranged to receive the second output signal from said receiving unit and to determine both the lateral and vertical deflection of said carriage from said signal.

7. A device according to claim 6 wherein said second light source comprises:
   a mono-chromatic light source including a light directing reflector and lens assembly;
   said saw-tooth pattern being arranged to be illuminated by said second light source;
   a narrow band filter as front exit window; and
   a movable lens assembly in the path of light emitted by said second light source comprising:
   a narrow band filter as input window;
   a zoom lens assembly including a motor for rotating the zoom mechanism and a position encoder for determining the zoom condition adjacent said filter;
   said merging means comprising:
   a beam folding and splitting prism which merges the optical axis of the zoom lens onto the optical axis of said optical sensor means.

8. A coordinate measuring system wherein there is provided:
a cartesian manipulator having at least one moving axis;
means as defined in claim 1 for monitoring the angular deflections of said moving axis and generating output signals corresponding thereto;
micro computer means for adjusting the position analysis of said axis in accordance with said output signals.

9. A device according to claim 8 wherein said cartesian manipulator comprises a two-dimensional cartesian manipulator comprising two mutually perpendicularly moving axes; and
said means for monitoring comprises means for monitoring the angular and lateral deflections of each of said moving axes and generating output signals corresponding thereto; and
said micro computer means is operative to adjust the position analysis of each of said axes in accordance with said output signals.

10. A device according to claim 8 wherein said cartesian manipulator comprises a three-dimensional cartesian manipulator comprising three mutually perpendicular moving axes; and
said means for monitoring comprises separate means for monitoring the angular and lateral deflections of each of said moving axes and generating output signals corresponding thereto; and
said micro computer means is operative to adjust the position analysis of each of said axes in accordance with said output signals.

11. A device for electro-optical monitoring of angular deflections of a moving carriage relative to a stationary track along which it moves, comprising:
a transmitting unit mounted on the moving carriage having a light source illuminating a pattern means; said light source being mono-chromatic and having a light directing reflector and lens assembly;
said lens assembly having a narrow band filter as front exit window;
said pattern means having a saw-tooth transparent accurate pattern disposed in the focal plane of said lens for illumination by said light source;
a receiving unit mounted on the track in light receiving relationship with the transmitting unit, said receiving unit having optical sensor means having a narrow band filter as an input window for sensing the orientation of the illuminated pattern transmitted from said transmitting unit and providing an output signal corresponding thereto;
micro computer means arranged to receive the output signal from said receiving unit and to determine the angular deflection of said carriage utilizing the information derived from said signal in the form of the saw-tooth pattern's configuration; said micro computer also being arranged to control said light source and to evaluate the position deflection of said pattern on the position sensor means for determination of angular deflections.

12. A device for electro-optical monitoring of angular deflections of a moving carriage relative to a stationary track along which it moves, comprising:
a transmitting unit mounted on the moving carriage having:
a light source including a light directing reflector and lens assembly;
a transparent accurate pattern arranged to be illuminated by said light source, said pattern being of a configuration such that rotation of the pattern around its center can be detected; and
a lens arranged such that said pattern is disposed in the focal plane of said lens;
a receiving unit mounted on the track in light receiving relationship with the transmitting unit having:
a lens;
optical position sensor means disposed in the focal plane of said lens for sensing the light pattern transmitted from said transmitting unit and providing an output signal corresponding thereto; and
micro computer means arranged to control said light source, to receive the output signal from said receiving unit, and to evaluate the position deflection of said pattern on the position sensor means for determination of angular deflections and for analyzing the true position of said carriage utilizing the information derived from said output signal.

13. A device according to claim 12 wherein said light source comprises a mono-chromatic light source.

14. A device according to claim 12 wherein the lens on said transmitting unit has a narrow band filter as front exit window, and a narrow band filter is disposed adjacent the lens on said receiving unit as an input window.

15. A device according to claim 12 wherein said optical position sensor means comprises a one-dimensional matrix of photo-sensitive elements set in geometrical precision, one relative to another.

16. A device according to claim 12 wherein said optical position sensor means comprises a line scanner.

17. A device according to claim 12 wherein said optical position sensor means comprises an area scanner.

18. A device according to claim 12 further comprising means for monitoring both lateral and vertical deviations of said carriage which comprises:
a second accurate pattern means, said pattern being of a configuration such that rotation of the pattern around its center can be detected;
a second light source mounted in said transmitting unit for illuminating said second accurate pattern;
a movable lens assembly arranged to receive the light pattern transmitted from said second light source and transmit it to said position sensor means;
means for merging the optical axis of said movable lens onto the optical axis of the optical sensor means;
said optical sensor means being arranged to provide a second output signal corresponding to the light transmitted by said movable lens assembly; and
said micro computer means being arranged to receive the second output signal from said receiving unit and to determine from said signal the lateral deflection of said carriage from said signal.

19. A device according to claim 18 and wherein said second light source comprises a mono-chromatic light source and wherein said second light source has a narrow band filter as front exit window.

20. A device according to claim 12 wherein said optical position sensor means comprises a two-dimensional matrix of photo-sensitive elements, each set in precise geometrical relationship to the other.

21. A device for electro-optical monitoring of angular deflections of a moving carriage relative to a stationary track along which it moves, comprising:

a first saw-tooth pattern means;

a first transmitting unit mounted on the moving carriage and comprising a first light source illuminating said first pattern means;

a first receiving unit mounted on the track in light receiving relationship with the first transmitting unit;

a second saw-tooth pattern means;

a second transmitting unit mounted on the moving carriage and comprising a second light source illuminating said second pattern means;

a second receiving unit mounted on the track in light receiving relationship with the second transmitting unit;

means for merging the light from said first and second transmitting units and focusing the light from both transmitting units on an optical sensor means for sensing the orientation of the illuminated pattern transmitted from said transmitting units and providing an output signal corresponding thereto; and micro computer means arranged to receive the output signals from said receiving units and to determine the type and magnitude of the angular deflection of said carriage utilizing the information derived from said signals.

22. A device according to claim 21 wherein said first and second light sources are operated alternatively on a time-share basis to generate separate and independent output signals, and said micro computer means being arranged to receive both of said output signals.

* * * * *